Dec. 9, 1924.  
I. HENNINGS  
FISHING LURE  
Filed Aug. 26, 1920

1,518,199

Ivar Hennings  
INVENTOR.

BY George J. Itsch  
ATTORNEY.

Patented Dec. 9, 1924.

1,518,199

UNITED STATES PATENT OFFICE.

IVAR HENNINGS, OF SOUTH BEND, INDIANA.

FISHING LURE.

Application filed August 26, 1920. Serial No. 406,206.

*To all whom it may concern:*

Be it known that I, IVAR HENNINGS, a citizen of the United States, residing at South Bend, in the county of St. Joseph and State of Indiana, have invented certain new and useful Improvements in Fishing Lures, of which the following is a specification.

My invention relates to fishing lures, and more particularly to artificial casting flies, or the like, and consists primarily in the provision of a buoyant body equipped with a hook of a particular form which may be secured to the body in the manufacture of the lures in an easy and rapid manner; and which, in connection with the simple expedients employed in securing the body and hook together, results in a material saving of time as well as cost of materials in the manufacture of the lures, as well as the additional advantages resulting from simplicity of structure and the use of a minimum number of parts. Generally speaking, my object is to provide a simple and economical construction for fishing lures, as well as a construction which will withstand the more or less rough usage to which such lures are subjected, as by attack of and the struggles of game fish when hooked, and in the removal of the fish from the hook.

The invention in the preferred form of details will be described in the following specification, reference being had particularly to the accompanying drawings, in which:—

Figure 1:
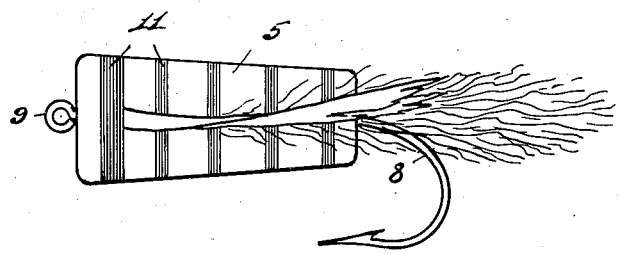
Figure 1 is a side elevation of a lure embodying the improvement.
Figure 2:
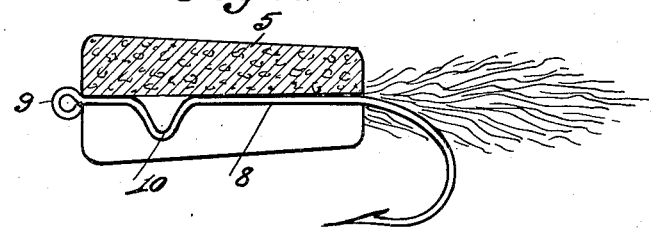
Figure 2 is a vertical sectional view of the lure as shown in Fig. 1.
Figure 3:
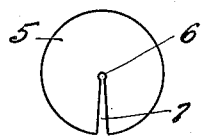
Figure 3 is an end view of the lure body.
Figure 4:
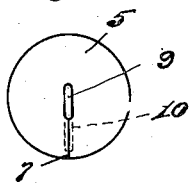
Figure 4 is a similar view showing the hook applied thereto in permanent relation.

The body 5 of the lure, which may be variously modified as to form, preferably consists of a buoyant material having a yielding nature to a degree, such as cork, or a synthetic material having like properties. Such body is provided with an axial bore 6, which bore is intersected by a slit 7 coextensive with the length of the body, as clearly shown in Figs. 2 and 3, in which latter figure the body portions separated by the slit are spread apart preliminary to the application of the hook, the yielding nature of cork permitting the parts to be spread within limits without fracturing or splitting the remaining portion of the body.

Adapted to fit the bore 6 of the body is a fish hook 8, provided with the usual terminal eye 9 for attachment of the fish line, and formed in its shank portion with a loop or bend 10, to provide a lateral projection serving as a means for preventing relative turning and endwise movement of the body and hook, as in the manner presently explained. After placement of the hook in proper position with relation to the body, as well as the placement within the slit of the ends of feathers, hair, and other objects to simulate bugs and other creatures, as is well understood in the art, windings 11 of thread or wire are applied at intervals about the body in a manner to tightly draw together the slitted portions thereof, such being drawn together sufficiently firm to cause the loop portion of the hook shank to become embedded in the body material, from which it follows that the hook and body will be held in a permanently fixed relation, so that independent turning of the body or hook or relative endwise movement of said parts cannot occur. Also by positioning the eye of the hook so as to abut the end of the body, additional security is had against shifting of the body with relation to the hook in one direction.

While the foregoing is the preferred form of my invention, it is to be understood that I do not limit myself to the precise structure shown and described, as it is obvious that various modifications thereof may be made without departing from the spirit of the invention as defined by the claim.

Having thus described my invention, what is claimed is:—

The combination with a fish hook, a shank carried by said fish hook, said shank being axially disposed in a slit in one side of a resilient body member, of a bend in said shank intermediate its ends in the plane of the shank and forming an offset portion, said offset portion being on the same side of the shank as the hook.

In testimony whereof I affix my signature.

IVAR HENNINGS.